UNITED STATES PATENT OFFICE.

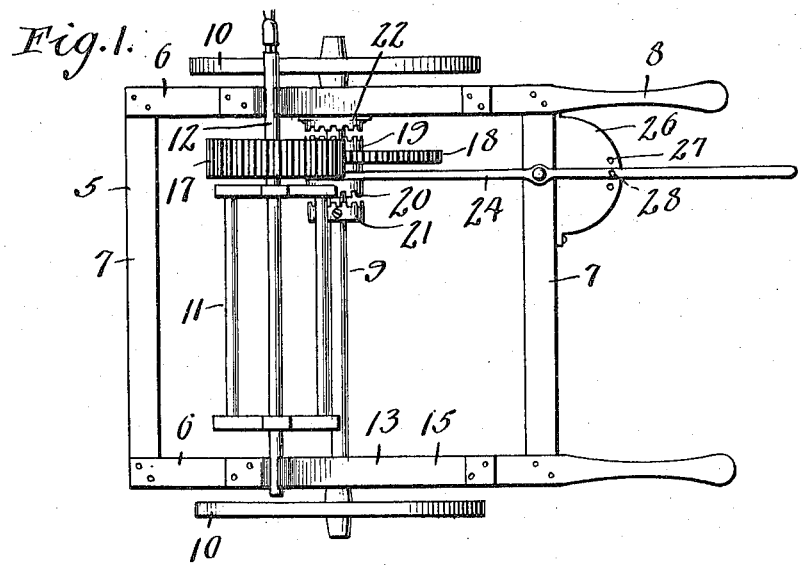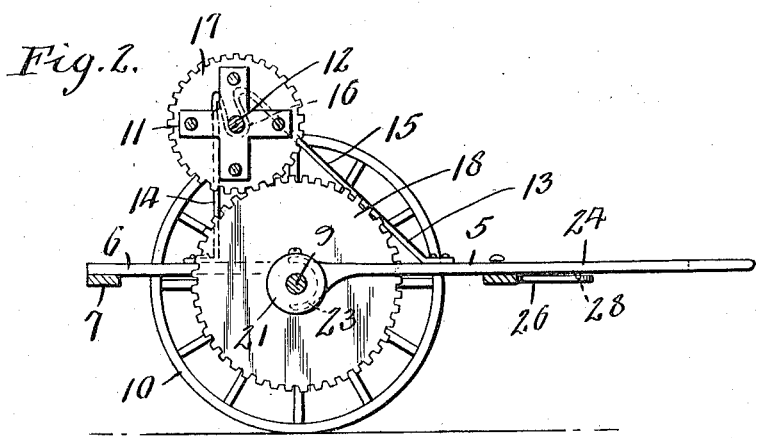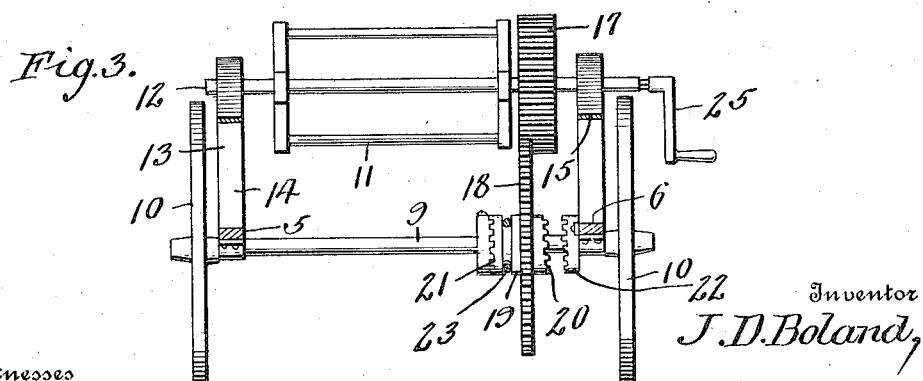

JEFFERSON D. BOLAND, OF EUREKA, MISSOURI.

COMBINED REEL-CARRIER AND WIRE-STRETCHER.

1,152,273.                Specification of Letters Patent.        Patented Aug. 31, 1915.

Application filed December 29, 1914. Serial No. 879,582.

*To all whom it may concern:*

Be it known that I, JEFFERSON D. BOLAND, a citizen of the United States, residing at Eureka, in the county of St. Louis and State of Missouri, have invented new and useful Improvements in Combined Reel-Carriers and Wire-Stretchers, of which the following is a specification.

The present invention contemplates the provision of a combined reel carrier and wire stretcher, whereby the reel can be rotated from the axle of the portable frame as the latter is wheeled over the ground for the purpose of winding the wire thereon, or held stationary to permit stretching of the wire during the course of travel of the frame.

Another object of the invention is the provision of a device for the above mentioned purposes, constructed to permit the reel to be also independently rotated by means of a crank for the purpose of winding the wire thereon.

Other objects will appear from the following description when considered in connection with the accompanying drawing, the invention residing in the specific construction, combination and arrangement of parts hereinafter more fully described.

In the drawing forming a part of this application, like numerals of reference indicate similar parts in the several views and in which:—

Figure 1 is a top plan view. Fig. 2 is a longitudinal sectional view. Fig. 3 is a transverse sectional view.

Referring more particularly to the drawing 5 indicates a portable frame, comprising the side members 6 and cross members 7, the former being extended to provide the handles 8. Journaled in suitable bearings secured to the under side of the members 6 is the axle 9 upon the opposite ends of which are mounted the ground wheels 10.

Mounted above the frame is a reel 11 carried by the shaft 12, the latter being journaled in the bearings 13. Each of these bearings is constructed from a single strip of material terminally secured to the side members 6, and including a vertical portion 14, a rearwardly inclined portion 15, and an intermediate angularly disposed bearing loop 16 connecting the portions 14 and 15 respectively. As shown the bearing loops 16 are disposed in horizontal alinement and receive the opposite ends of the shaft 12.

Fixed upon the shaft 12 is a gear 17 which meshes with a gear 18 the latter being loosely mounted upon the axle 9. The hub 19 of the gear 18 is provided with a clutch face 20 at both sides thereof for interchangeable engagement with the coöperating clutch members 21 and 22 respectively for the purpose to be presently described. A yoke 23 is connected with the hub 19 and provided with the lever 24 for shifting the gear 18 into and out of engagement with the clutch members 21 and 22 respectively. The clutch member 21 is fixed upon the axle 9 at one side of the gear 18 and when engaged by the hub 19 the gear 18 is held fixed with relation to the axle 9, and operates to rotate the reel to wind the wire thereof as the frame is wheeled over the surface.

When the device is used for the purpose of stretching wire, it is desirable to lock the reel and shaft 12 against rotation. To do this the lever 24 is operated to shift the gear 18 into engagement with the clutch member 22, this latter member being fixed to the frame prevents rotation of both the gears 17 and 18 respectively and the shaft 12. The free end of the wire to be stretched is then secured to the reel, and the frame pushed forwardly over the ground thereby stretching the wire, the angular disposition of the bearing loops 16 preventing axial disengagement of the shaft therefrom.

The reel may also be manually operated to wind the wire thereon by means of the crank handle 25 which is detachably connected with one end of the shaft 12. When used in this manner the frame is tilted to permit the handles 8 to rest upon the ground with a view of steadying the frame. The gear 18 is then shifted by means of the lever 24 to neutral position, or in other words to a position upon the axle between the clutch members 21 and 22 respectively. As the gear 18 is loosely mounted upon the axle, it will be readily understood that the shaft 12 together with the reel may be independently rotated for the purpose hereinabove stated.

Secured to the rear cross member 7 is a plate 26 having a series of openings 27 for the reception of the pin 28 carried by the lever 24, for the purpose of holding the lever 24 and the gear 18 in any of their adjusted positions.

While I have shown and described the preferred form of my invention, I desire to have it understood that various changes in the construction and arrangement of parts may be resorted to when desired as fall within the scope of the appended claims.

What I claim is:—

1. The combination with a frame, an axle journaled thereon, and wheels secured to the axle, of a shaft journaled upon the frame above the axle, a reel carried by the shaft, a gear fixed thereto, a second gear loosely mounted on the axle and meshing with the first mentioned gear, the hub of said second gear having a clutch face at its opposite sides, spaced clutch members arranged at the opposite sides of the said gear, one of said members being fixed to the axle and the other to the frame, and means for shifting the gear into engagement with either of said clutch members as and for the purpose described.

2. The combination with a frame, an axle journaled thereon, and wheels secured to the axle, of a shaft journaled in the frame above the axle, a reel carried by the shaft, a gear carried by the shaft, a second gear loosely mounted on the axle and meshing with the first mentioned gear, the hub of said second gear having a clutch face on both sides thereof, a clutch member fixed on the axle and adapted to engage one of the said clutch faces of the hub to operate said shaft on rotation of the axle, a second clutch member secured to the frame and adapted to engage the other of said clutch faces of the hub to lock said shaft against rotation, means for shifting said second gear into engagement with either of said clutch members, and means for locking said gear in adjusted position.

3. The combination with a frame, an axle journaled thereon, and wheels carried by the axle, of a shaft journaled upon the frame above the axle, a reel carried by the shaft, a gear fixed to the shaft, a second gear loosely mounted on the axle and meshing with the first mentioned gear, the hub of said second gear having a clutch face at its opposite sides, spaced clutch members arranged at the opposite sides of the said gear, one of said members being fixed to the axle and the other to the frame, means for shifting the gear into engagement with either of the clutch members to operate the shaft on rotation of the axle or to prevent rotation of the shaft, and means for locking the gear in engagement with either of said clutch members or in neutral position between said members to permit said shaft to be independently rotated.

In testimony whereof I affix my signature in presence of two witnesses.

JEFFERSON D. BOLAND.

Witnesses:
HENRY A. GUIBOR,
PHILIP P. BOLAND.